Patented Feb. 11, 1947

2,415,632

UNITED STATES PATENT OFFICE 2,415,632

PROCESS FOR THE TREATMENT OF
NICOTINIC ACID DERIVATIVES

Paul W. Garbo, Brooklyn, N. Y.

No Drawing. Application June 25, 1942,
Serial No. 448,413

11 Claims. (Cl. 260—295.5)

This invention relates to a process for the treatment of nicotinic acid derivatives; more particularly, for the treatment of nicotinic acid derivatives for the production of nicotinamide and substituted amides of nicotinic acid.

Nicotinamide is recognized as an important pharmaceutical product prescribed instead of nicotinic acid where the latter has undesirable effects. This invention, therefore, more specifically relates to a more economical production of this highly desirable nicotinic acid compound.

Of the methods for producing nicotinamide known to me, the one proposing the conversion of ammonium nicotinate to the nicotinamide has received greatest attention by the workers in the field since, from a theoretical point of view, one might predict it to be the most direct and economical.

The essential phases of the aforementioned method of forming the nicotinamide involve the formation of ammonium nicotinate by merely neutralizing nicotinic acid with ammonium hydroxide and splitting off, with the aid of heat, a molecule of water from each molecule of ammonium nicotinate, to leave a molecule of nicotinamide. However, in the latter step, since ammonium nicotinate is not a very stable compound, heat tends to decompose the nicotinate into the original nicotinic acid and ammonia. The shortcomings of these tendencies have led to a very poor yield of nicotinamide.

Known to me also is the improvement of the aforementioned method as effected by bubbling ammonia gas through a mass of molten ammonium nicotinate undergoing the heat treatment. Thus, by bubbling ammonium gas through molten ammonium nicotinate at elevated temperatures, that is about 160 to 170° C., conversions as high as 85% were effected—that is to say, the final reaction mass would show by analysis to be comprised of about 85% nicotinamide and about 15% nicotinic acid as such, or as its salt. Even the procedure involving the bubbling of ammonia through the nicotinate to reach 85% conversion involved a time element of many hours. Prolongation of the treatment to achieve higher conversions became so unreasonably long as to be impractical commercially.

The recovery of nicotinamide from the aforementioned reaction mass has required time-consuming and expensive procedures in order to meet present stringent standards and specifications with regard to the physical properties of the end product, such as melting point, color, hydrogen ion concentration (pH, ash, etc. Also, in view of the high cost of nicotinic acid, efforts to effect economies have made it necessary to recover the unconverted nicotinic acid for reuse in a subsequent reaction by means of difficult and expensive operations.

Other methods of manufacturing nicotinamide encounter the same general difficulties of incomplete conversion of the nicotinic acid and its subsequent separation from the amide. Thus, in the United States Patent 2,280,040, granted on April 14, 1942, to Seibert, et al., there is disclosed the preparation of nicotinamide by first esterifying nicotinic acid with alcohol in the presence of sulfuric acid and then reacting the nicotinic acid ester with ammonium hydroxide. As pointed out in the patent specification, the latter step yields not only nicotinamide but also ammonium nicotinate. The patent proposes to solve the difficult problem of separating nicotinic acid and its amide by treating a solution of the mixture with copper or zinc acetate to precipitate the metal nicotinate. From a commercial point of view, the suggested method of separation is practical when only about 2% of nicotinic acid remains admixed with the amide.

As a matter of fact, however, with any of the known processes of producing nicotinamide, a conversion of about 80% is generally considered high and satisfactory; obviously, about 20% of unconverted material remains.

The foregoing difficulties account for the present high cost of nicotinamide as compared with nicotinic acid when from a theoretical procedural point of view, no great disparity in price should exist.

My invention is predicated upon the discovery of the feasibility of treating a mixture of nicotinamide with a selected number of nicotinic acid derivatives, consisting of nicotinic acid, ammonium nicotinate and mixtures thereof, to convert the nicotinic acid derivatives to a different form of nicotinic acid compound, thereby to make feasible the increase in yield of the nicotinamide and that the presence of nicotinamide does not interfere with the subsidiary conversion of nicotinic acid derivatives which may be in the reaction mass during the formation of the nicotinamide.

My invention herein emphasized, and which will appear more clearly as this description proceeds, is predicated upon the discovery that in the manufacture of nicotinamide, the unconverted nicotinic acid derivatives contained in the menstruum of the ingredients forming the amide may be converted to increase the yield of the desirable nicotinic acid derivative by treatment with an acid-halide forming reagent.

It is therefore an object of my invention to provide a method of treating nicotinamide mixtures to increase their yield of nicotinamide.

It is further an object of my invention to provide a method in which nicotinamide is formed from ammonium nicotinate or nicotinic acid and to "drive" the ammonium nicotinate or nicotinic acid found admixed with nicotinamide in the reaction products of various manufacturing processes, to the amide stage.

Another object of my invention resides in the provision of a method for producing mixed nicotinic acid amides by converting ammonium nicotinate to nicotinamide containing ammonium nicotinate and converting the residual ammonium nicotinate progressively to nicotinic acid, the nicotinyl halide, and then the amide compound of nicotinic acid.

Still further objects of my invention reside in the provision of a process which utilizes directly the ammonium nicotinate or nicotinic acid content of a nicotinamide mixture, economically to recover desirable end products, without undergoing wasteful recycling operations by reason of the incomplete or intermediately converted products of nicotinic acid in the formation of nicotinamide.

A still further object of my invention resides in the simplification of the method for reuse of the unconverted material entering into the production of nicotinamide and occurring admixed with nicotinamide, whereby a highly economical method is provided for the production of nicotinic acid derivatives, such as nicotinamide.

In accordance with my invention, the reaction product of any process for producing nicotinamide, which contains at least about 70% nicotinamide and of which the remainder is predominantly ammonium nicotinate or nicotinic acid or any mixture thereof, is subjected in the absence of water to chemical treatment to convert the residual ammonium nicotinate or nicotinic acid into nicotinyl halide. Nicotinyl halide may at this point be separated from the amide, for example, by vacuum distillation, and thereafter reacted with ammonia to produce a further quantity of nicotinamide, or alternatively, the nicotinyl halide admixed with nicotinamide may be reacted with ammonia to yield a product of increased nicotinamide content.

More specifically, a mixture of about 70% to about 95% nicotinamide and the remainder predominantly of nicotinic acid is treated with an acid-halide forming reagent, such as thionyl chloride, thionyl bromide, sulfuryl chloride or phosphorus oxychloride, to convert nicotinic acid into the corresponding nicotinyl halide. Inasmuch as ammonium nicotinate is an unstable salt tending to decompose into nicotinic acid and ammonia gas, the amide mixtures which are to be treated by the process of my invention, may contain either nicotinic acid or ammonium nicotinate or their mixtures. When ammonium nicotinate is present, I prefer first to decompose the ammonium nicotinate by heating the amide mixture to a temperature in the range of about 100° C. to about 240° C., preferably about 140° C. to about 200° C., particularly while blowing an inert gas, such as nitrogen, through the mass to sweep out ammonia and thus to convert the free nicotinic acid to the acid halide. Accordingly, the process of my invention is applicable to nicotinamide mixtures containing nicotinic acid or ammonium nicotinate or mixtures of these.

Having formed the nicotinyl halide, it is converted to nicotinamide by reacting it with ammonia either after it has been separated from the original nicotinamide or while admixed therewith. In either case, the original nicotinamide content is increased and the subsequent purification steps are simplified and shortened because of the decreased content of unconverted material. Nicotinamide of high purity is thus recoverable by any of the methods known in the art, such as crystallization from an alcohol solution.

The reagent for producing the acid halide is preferably one boiling at a temperature not higher than about 200° C. Examples of acid-halide forming reagents which may be employed in my process are: thionyl chloride and bromide, phosphorus oxychloride and oxybromide and sulfuryl chloride. The reagent is preferably introduced into the amide mixture at a temperature in the range of about 100° C. to about 180° C. Obviously, when the reagent has a lower boiling point than the selected reaction temperature, the reaction is conducted under refluxing conditions. Also, with the lower boiling reagents such as sulfuryl chloride and thionyl chloride, it is advisable to first vaporize the reagent separately and to bubble its vapors through the molten amide mixture; in this manner rapid reaction is attained.

When nicotinic acid has been converted to the halide, any residual reagent is removed from the reaction mass by elevating the temperature sufficiently to distill it away.

As previously stated, the mixture of amide and nicotinyl halide may at this point be separated, for example by vacuum distillation, and the separated nicotinyl halide converted to amide by reacting it with ammonia, or the amide-halide mixture as such may be exposed to gaseous ammonia to yield a product of very high amide content.

The following specific examples are illustrative of the methods which may be employed.

*Example 1*

Nicotinic acid is neutralized with ammonium hydroxide and heated to distill away the water of reaction. The resulting molten mass of ammonium nicotinate is maintained at a temperature of 160° to 170° C. and a steady copious stream of ammonia is bubbled therethrough. When upon analysis the reaction mass shows a composition of 85% nicotinamide and about 15% nicotinic acid as such or its ammonium salt, the flow of ammonia is discontinued and nitrogen is blown through the molten mass to decompose residual ammonium nicotinate until no ammonia can be detected in the effluent gas. To this nicotinamide mixture, thionyl chloride is gradually added in the proportion of 50 c. c. per 500 grams of the amide mixture. The addition is made while maintaining a temperature of about 130° C. and efficient refluxing to return vaporized thionyl chloride. When the reaction is completed, excess thionyl chloride is removed by distillation and ammonia is again bubbled through the liquid mass at a temperature of about 150° C. to convert nicotinyl chloride into nicotinamide. At the end of the reaction, nitrogen is again blown through the liquid mass to dispel residual ammonia and the liquid is poured into anhydrous isopropyl alcohol in the ratio of 500 grams of reaction mass to 1 liter of alcohol. Ammonium chloride precipitates out and while warm the solution is filtered off. Nicotinamide is obtained from the filtrate by crystallizing at a temperature of 0° C. A product of very high purity, i e. one having 133° C. melting point, is worked up by recrystallizing the amide from a water solution prepared in the proportions of 50 grams amide per 50 c. c. water. Prior to recrystallization, the solution is given a short treatment with activated carbon.

Example 2

A mixture containing 80% nicotinamide and nearly 20% nicotinic acid is subjected to reaction with thionyl bromide by bubbling the bromide vapors at 138° C. through the liquid mixture. Adequate refluxing is provided to return thionyl bromide from the effluent gas. When the nicotinic acid has been converted to nicotinyl bromide, the flow of thionyl bromide vapor is stopped and excess bromide remaining in the reaction mass is distilled away. As in the previous example, the reaction mass is contacted with ammonia to change the nicotinyl bromide to the amide and thereafter worked up to recover nicotinamide of high purity and very white color.

It is clear that the nicotinyl halide formed by the process of my invention need not be converted into nicotinamide. Instead of reacting it with ammonia, an amine, such as diethylamine or phenetidine, may be used to produce the corresponding substituted amide. Such substituted amides of nicotinic acid are growing in commercial importance. For example, nicotinic acid diethylamide, also known as nikethamide, is widely used by the medical profession as a heart stimulant.

While, admittedly, it is old to prepare amides by converting organic acids to acid halides and, in turn, reacting the halides with ammonia or amines, it is surprising and unexpected that this method could be successfully used on nicotinic acid while admixed with a major portion of nicotinamide. As is well known, the reagents used for making the acid halides are extremely reactive and, furthermore, amides are degradable either by hydrolysis or other chemical reaction. Therefore, it was anticipated that exposing the nicotinamide mixtures to such reagents as thionyl chloride would have led to the degradation of the amide to nicotinyl halide, beta-pyridine nitrile and other by-products. Contrary to these expectations, I have found that amide mixtures may be reacted with acid-halide forming reagents substantially without adverse effect upon the nicotinamide content. It is, of course, necessary to observe the conditions set forth above for carrying on the reaction without undesirable side effects.

It will thus be observed that by my invention I have provided a highly economical procedure for the treatment of nicotinic acid derivatives, and for the formation of highly desirable nicotinamide and substituted amides, which procedure is free from the deterrent characterizing the formation of nicotinamide by procedures including substantial admixtures of nicotinic acid derivatives. Thus, by my invention the losses of incomplete or retarded progress in the formation of the nicotinamide to the maximum theoretical yield by known methods are overcome and minimized.

Having thus described my invention and illustrated its use, what I claim as new and desire to secure by Letters Patent is:

1. In the process of producing nicotinamide, the improvement which comprises subjecting a mixture containing at least about 70% of nicotinamide and a predominant remainder of nicotinic acid to a halogen-containing acid-halide forming reagent having a boiling point not higher than about 200° C., which converts the nicotinic acid to nicotinyl halide while maintaining the reaction at a temperature in the range of about 100° C. to about 180° C., removing the excess of the reagent and treating the mass with an ammonia-type compound.

2. In the process of producing nicotinamide, the improvement which comprises subjecting a mixture containing at least about 70% of nicotinamide and a predominant remainder of nicotinic acid to a halogen-containing acid-halide forming reagent having a boiling point not higher than about 200° C., which converts the nicotinic acid to nicotinyl halide while maintaining the reaction at a temperature in the range of about 100° C. to about 180° C., removing the excess of the reagent and treating the mass with ammonia.

3. In the process of producing nicotinamide, the improvement which comprises subjecting a mixture containing at least about 70% of nicotinamide and a predominant remainder of nicotinic acid to a halogen-containing acid-halide forming reagent having a boiling point not higher than about 200° C., which converts the nicotinic acid to nicotinyl halide while maintaining the reaction at a temperature in the range of about 100° C., to about 180° C., removing the excess of the reagent and treating the mass with an amine.

4. In the process of manufacturing nicotinamide, the step of treating a crude product comprising at least about 70% of nicotinamide and a predominant remainder of unconverted nicotinic acid compound taken from the group consisting of nicotinic acid, ammonium nicotinate, and mixtures thereof, with an acid-halide forming reagent comprising a compound containing a halogen, another nonmetallic acid-forming element and oxygen, so as to convert said unconverted nicotinic acid compound into nicotinyl halide.

5. In the process of manufacturing nicotinamide, the step of treating a crude product comprising at least about 70% of nicotinamide and a predominant remainder of unconverted nicotinic acid compound taken from the group consisting of nicotinic acid, ammonium nicotinate, and mixtures thereof, with an acid-halide forming reagent comprising a compound containing a halogen, another nonmetallic acid-forming element and oxygen, having a boiling point not higher than about 200° C., so as to convert said unconverted nicotinic acid compound into nicotinyl halide.

6. In the process of manufacturing nicotinamide, the step of treating a crude product comprising at least about 70% of nicotinamide and a predominant remainder of unconverted nicotinic acid compound taken from the group consisting on nicotinic acid, ammonium nicotinate, and mixtures thereof, with a reagent taken from the group consisting of thionyl chloride, thionyl bromide, phosphorus oxychloride, phosphorus oxybromide and sulfuryl chloride, so as to convert said unconverted nicotinic acid compound into nicotinyl halide, said step being conducted in the absence of water.

7. In the process of manufacturing nicotinamide, the step of treating a crude product comprising at least about 70% of nicotinamide and a predominant remainder of unconverted nicotinic acid compound taken from the group consisting of nicotinic acid, ammonium nicotinate, and mixtures thereof, while in molten state at a temperature in the range of about 100° to about 180° C., with thionyl chloride so as to convert said unconverted nicotinic acid compound into nicotinyl chloride.

8. In the process of manufacturing nicotinamide, which yields a crude product comprising at least about 70% of nicotinamide and a predominant remainder of unconverted nicotinic acid and ammonium nicotinate, the steps of decomposing the ammonium nicotinate in said crude product to nicotinic acid, and then treating said crude product with an acid-halide forming reagent comprising a compound containing a halogen, another nonmetallic acid-forming element and oxygen, so as to convert its unconverted nicotinic acid content into nicotinyl halide.

9. The process of manufacturing nicotinamide, yielding a crude product comprising at least 70% of nicotinamide and a predominant remainder of unconverted nicotinic acid and ammonium nicotinate, which comprises the steps of decomposing the ammonium nicotinate in said crude product to nicotinic acid, then treating said crude product with an acid-halide forming reagent comprising a compound containing a halogen, another nonmetallic acid-forming element and oxygen, so as to convert its unconverted nicotinic acid content into nicotinyl halide, separating the nicotinamide and the nicotinyl halide, and reacting the nicotinyl halide with an amine to produce a substituted amide of nicotinic acid.

10. The process of claim 9 wherein the amine is diethylamine.

11. In the process of manufacturing nicotinamide, the steps of treating a crude product comprising at least about 70% of nicotinamide and a predominant remainder of unconverted nicotinic acid compound taken from the group consisting of nicotinic acid, ammonium nicotinate, and mixtures thereof, with an acid-halide forming reagent comprising a compound containing a halogen, another nonmetallic acid-forming element and oxygen, so as to convert said unconverted nicotinic acid compound into nicotinyl halide, separating the nicotinamide and the nicotinyl halide, and reacting the nicotinyl halide with an amine to produce a substituted amide of nicotinic acid.

PAUL W. GARBO.

REFERENCES CITED

The following references are of record in the file of this patent:

FOREIGN PATENTS

| Number | Country | Date |
|---|---|---|
| 184,625 | British | Aug. 24, 1922 |

OTHER REFERENCES

"The Chemistry of Organic Compounds," Conant, pages 150–152, MacMillan Co., 1934.